(12) United States Patent
Yan (10) Patent No.: US 10,911,985 B2
(45) Date of Patent: Feb. 2, 2021

(54) SERVICE DATA SPLITTING METHOD AND APPARATUS (71) Applicant: HUAWEI TECHNOLOGIES CO., LTD., Guangdong (CN)

(72) Inventor: Haidong Yan, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 15 days.

(21) Appl. No.: 16/220,550

(22) Filed: Dec. 14, 2018

(65) Prior Publication Data
US 2019/0124552 A1 Apr. 25, 2019

Related U.S. Application Data (63) Continuation of application No. PCT/CN2016/085797, filed on Jun. 15, 2016.

(51) Int. Cl.
H04W 28/08 (2009.01)
H04W 28/10 (2009.01)
(Continued)

(52) U.S. Cl.
CPC .......... H04W 28/08 (2013.01); H04L 47/30 (2013.01); H04W 28/0231 (2013.01);
(Continued)

(58) Field of Classification Search
None
See application file for complete search history.

(56) References Cited

U.S. PATENT DOCUMENTS

2006/0223585 A1* 10/2006 Legg .................. H04L 47/10
455/560
2015/0043492 A1 2/2015 Baek et al.
(Continued)

FOREIGN PATENT DOCUMENTS

CN 104202768 A 12/2014
CN 104427554 A 3/2015
(Continued)

OTHER PUBLICATIONS

Wang, Hua & Rosa, Claudio & Pedersen, Klaus. (2015). Inter-eNB Flow Control for Heterogeneous Networks with Dual Connectivity. IEEE Vehicular Technology Conference. 2015. 10.1109/VTCSpring.2015.7145881. (Year: 2015).*

(Continued)

Primary Examiner — Faruk Hamza
Assistant Examiner — Cassandra L Decker
(74) Attorney, Agent, or Firm — Kilpatrick Townsend & Stockton LLP (57) ABSTRACT The application provides a service data splitting method and apparatus. A SeNB receives distributed service data from an MeNB based on a first expected volume of distributed data, and buffers the distributed service data. The SeNB determines a data volume change status of the distributed service data when a preset period expires, where the data volume change status includes a buffered-data volume reduced state, a buffered-data volume accumulated state, and a received-data volume insufficient state. The SeNB adjusts the first expected volume of distributed data based on the data volume change status to obtain a second expected volume of distributed data. and the SeNB sends the second expected volume of distributed data to the MeNB, so that the MeNB performs splitting based on the second expected volume of distributed data.

14 Claims, 7 Drawing Sheets (51) Int. Cl.
  H04W 92/20     (2009.01)
  H04W 28/12     (2009.01)
  H04L 12/835    (2013.01)
  H04W 28/02     (2009.01)
  H04L 12/26     (2006.01)
  H04L 12/841    (2013.01)
  H04W 80/08     (2009.01)
  H04W 76/15     (2018.01)

(52) U.S. Cl.
  CPC ........... *H04W 28/10* (2013.01); *H04W 28/12* (2013.01); *H04W 76/15* (2018.02); *H04W 92/20* (2013.01); *H04L 43/0876* (2013.01); *H04L 47/283* (2013.01); *H04W 80/08* (2013.01)

(56) References Cited

U.S. PATENT DOCUMENTS

| | | | |
|---|---|---|---|
| 2015/0085800 A1* | 3/2015 | Sivanesan | H04W 52/0274 370/329 |
| 2015/0326456 A1 | 11/2015 | Dudda et al. | |
| 2016/0219481 A1 | 7/2016 | Wang et al. | |
| 2016/0366616 A1 | 12/2016 | Wen et al. | |
| 2018/0324644 A1* | 11/2018 | Koskinen | H04L 47/30 |
| 2018/0332496 A1* | 11/2018 | Dudda | H04W 28/0236 |

FOREIGN PATENT DOCUMENTS

| | | |
|---|---|---|
| CN | 104797000 A | 7/2015 |
| CN | 104812003 A | 7/2015 |

OTHER PUBLICATIONS

Wang, H. et al. (2016). Dual connectivity for LTE-advanced heterogeneous networks. Wireless Networks, 22(4), 1315-1328. https://doi.org/10.1007/s11276-015-1037-6. (Year: 2016).*

H. Wang et al., "Dual connectivity for LTe-advanced heterogeneous networks", Wireless Netw, 2016, 11:1315-1328 (Year: 2016).*

A. Mukherjee ("Optimal flow bifurcation in networks with dual base station connectivity and non-ideal backhaul", Asilomar 2014, IEEE) (Year: 2016).*

W. Kim ("Adaptive resource scheduling for dual connectivity in heterogeneous IoT cellular networks", International Journal of Distributed Sensor Networks, V. 2016) (Year: 2016).*

International Search Report dated Feb. 21, 2017 in corresponding International Application No. PCT/CN2016/085797.

NEC: "Flow Control function over X2 for Dual connectivity", 3GPP Draft; R3-140679, vol. RAN WG3, No. San Jose Del Cabo, Mexico; Mar. 21, 2014, XP050820737, 3 pages.

CEWIT: "Some Issues in Flow Control Design for Data Forwarding over X2 Interface", 3GPP Draft; R3-141740, vol. RAN WG3, No. Dresden, Germany; Aug. 17, 2014, XP050796126, 3 pages.

ZTE: "Introduction of flow control periodicity on X2", 3GPP Draft; R3-142259, vol. RAN WG3, No. Shanghai, P.R. China; Sep. 26, 2014, XP050870771, 11 pages.

International Search Report dated Feb. 21, 2017 in corresponding International Patent Application No. PCT/CN2016/085797 (7 pages).

Written Opinion of the International Searching Authority dated Feb. 21, 2017 in corresponding International Patent Application No. PCT/CN2016/085797 (4 pages).

\* cited by examiner

| Bit (Bit) | | | | | | | | Number of octets (Number of Octets) |
|---|---|---|---|---|---|---|---|---|
| 7 | 6 | 5 | 4 | 3 | 2 | 1 | 0 | |
| Protocol data unit type (=1) (PDU Type (=1)) | | | | Spare field (Spare) | | Final frame number (Final Frame Ind.) | Lost packet report (Lost Packet Report) | 1 |
| Highest successfully delivered PDCP sequence number (Highest successfully delivered PDCP Sequence Number) | | | | | | | | 2 |
| Desired buffer size for the radio access bearer (DBS, Desired buffer size for the E-RAB) | | | | | | | | 4 |
| Minimum desired buffer size for the UE (Minimum desired buffer size for the UE) | | | | | | | | 4 |
| Number of lost X2-U sequence number ranges reported (Number of lost X2-U Sequence Number ranges reported) | | | | | | | | 1 |
| Start of lost X2-U sequence number range (Start of lost X2-U Sequence Number range) | | | | | | | | 4 * (Number of reported lost X2-U SN ranges) |
| End of lost X2-U sequence number range (End of lost X2-U Sequence Number range) | | | | | | | | |
| Spare extension field (Spare extension) | | | | | | | | 0-4 |

SERVICE DATA SPLITTING METHOD AND APPARATUS

CROSS-REFERENCE TO RELATED APPLICATIONS

This application is a continuation of International Application No. PCT/CN2016/085797, filed on Jun. 15, 2016, the disclosure of which is hereby incorporated by reference in its entirety.

TECHNICAL FIELD

The present disclosure relates to the field of communications technologies, and in particular, to a service data splitting method and apparatus.

BACKGROUND

Figure 1:
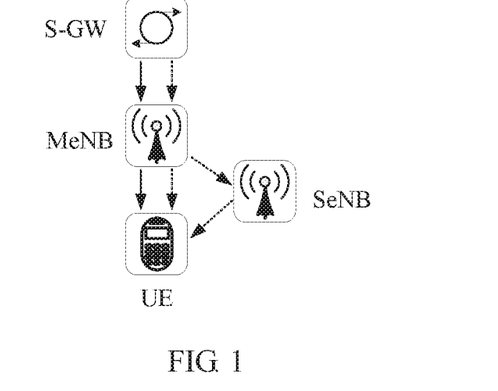
FIG. 1 is a schematic diagram of service data splitting in a dual connectivity technology according to an embodiment of the present invention.

With development of communications technologies, a dual connectivity (DC) technology is introduced in the 3rd Generation Partnership Project (3GPP) Release 12 standard. The dual connectivity technology means that user equipment (UE) may simultaneously use radio resources of two base stations to transmit uplink and downlink service data. Service data splitting is involved when the downlink service data of the UE is transmitted by using the two base stations. The 3GPP Release 12 standard stipulates that service data that can be split is service data in an radio link control acknowledged mode (RLC AM). As shown in FIG. 1, the two base stations in the dual connectivity technology include a master eNodeB (MeNB) and a secondary eNodeB (SeNB). For service data that cannot be split and is stipulated in the standard, for example, service data in a radio link control unacknowledged mode (RLC UM), the MeNB may directly send, to the UE, the service data received from a core network, as shown in a data flow indicated by solid-line arrows in FIG. 1. For service data that can be split and is stipulated in the standard, the MeNB may receive the service data from the core network, and split the service data into two parts. One part of service data is sent by the MeNB to the UE; and the other part of service data is distributed by the MeNB to the SeNB, and is sent by the SeNB to the UE, as shown in a data flow indicated by dashed-line arrows in FIG. 1.

Currently, a process of splitting the service data of the UE in the dual connectivity technology may be as follows: The SeNB sends an expected volume of distributed data to the MeNB. The expected volume of distributed data is a data volume of service data that the SeNB expects to obtain from the MeNB each time. The MeNB distributes, to the SeNB based on the received expected volume of distributed data, the service data received from the core network. The expected volume of distributed data is determined by each manufacturer based on a requirement. After the expected volume of distributed data is determined, the MeNB performs splitting based on the expected volume of distributed data.

In a process of implementing the present disclosure, the prior art has at least the following problem:

In the service data splitting process, both a sending rate of the SeNB and a data transmission delay between the MeNB and the SeNB change. Therefore, if the expected volume of distributed data is fixed, when the sending rate on an SeNB side decreases or the data transmission delay becomes small, data buffered by the SeNB is accumulated, thereby increasing a delay and consequently decreasing a throughput rate. Alternatively, when the sending rate on an SeNB side increases or the data transmission delay becomes large, data buffered by the SeNB is insufficient, consequently decreasing a throughput rate.

SUMMARY

To resolve a prior-art problem, embodiments of the present invention provide a service data splitting method and apparatus. The technical solutions are as follows:

According to a first aspect, a service data splitting method is provided, where the method includes:

receiving distributed service data sent by a master eNodeB MeNB, and buffering the distributed service data, where the distributed service data is service data distributed by the MeNB based on a first expected volume of distributed data;

determining a data volume change status of the distributed service data when a preset period expires, where the data volume change status includes a buffered-data volume reduced state, a buffered-data volume accumulated state, and a received-data volume insufficient state;

adjusting the first expected volume of distributed data based on the data volume change status to obtain a second expected volume of distributed data; and sending the second expected volume of distributed data to the MeNB, so that the MeNB performs splitting based on the second expected volume of distributed data. The data volume change status of the distributed service data is periodically determined, and the expected volume of distributed data is adjusted based on different data volume change statuses, so that the distributed service data can be adapted to a change in a sending rate of an SeNB, a change in a data transmission delay between the MeNB and the SeNB, and a change in a volume of service data received by the MeNB, thereby increasing a system throughput rate.

With reference to the first aspect, in a first possible implementation of the first aspect, the determining a data volume change status of the distributed service data when a preset period expires includes:

when the preset period expires, if a data volume of the buffered distributed service data is less than a first preset threshold, determining that the data volume change status is the buffered-data volume reduced state. It is determined that the data volume change status is the data volume reduced state. Therefore, the SeNB can increase the first expected volume of distributed data based on the state, so as to increase a volume of data subsequently received by the SeNB from the MeNB, and further increase a system throughput rate.

With reference to the first aspect, in a second possible implementation of the first aspect, the determining a data volume change status of the distributed service data when a preset period expires includes:

when the preset period expires, determining whether a data volume of the buffered distributed service data is greater than a volume of data buffered when the preset period previously expires;

if the data volume of the buffered distributed service data is greater than the volume of data buffered when the preset period previously expires, determining whether the data volume of the buffered distributed service data is greater than a second preset threshold;

if the data volume of the buffered distributed service data is greater than the second preset threshold, determining whether the preset period is a full scheduling period, where the full scheduling period indicates that a volume of data that needs to be sent to UE in each system scheduling in the preset period is not greater than a data volume of buffered service data; and if the preset period is a full scheduling period and a first preset quantity of consecutive preset periods including the preset period are all full scheduling periods, determining that the data volume change status is the buffered-data volume accumulated state. It is determined that the data volume change status is the data volume accumulated state. Therefore, the SeNB can reduce the first expected volume of distributed data based on the state, so as to reduce a volume of data subsequently received by the SeNB from the MeNB, and further reduce a transmission delay of the SeNB.

With reference to the first aspect, in a third possible implementation of the first aspect, the determining a data volume change status of the distributed service data when a preset period expires includes:

when the preset period expires, determining whether a data volume of distributed service data received each time in the preset period is less than the first expected volume of distributed data;

if yes, determining that the preset period is a received volume insufficient period; and if the preset period is a received volume insufficient period and a second preset quantity of consecutive preset periods including the preset period are all received volume insufficient periods, determining that the data volume change status is the received-data volume insufficient state. It is determined that the data volume change status is the received-data volume insufficient state. Therefore, the SeNB can reduce the first expected volume of distributed data based on the state, so as to reduce a volume of data subsequently received by the SeNB from the MeNB, and further increase a system throughput rate.

With reference to the first aspect, in a fourth possible implementation of the first aspect, the adjusting the first expected volume of distributed data based on the data volume change status to obtain a second expected volume of distributed data includes:

if the data volume change status is the buffered-data volume reduced state, adding a first preset adjustment value to the first expected volume of distributed data to obtain the second expected volume of distributed data; or if the data volume change status is the buffered-data volume accumulated state, subtracting a second preset adjustment value from the first expected volume of distributed data to obtain the second expected volume of distributed data; or if the data volume change status is the received-data volume insufficient state, subtracting a third preset adjustment value from the first expected volume of distributed data to obtain the second expected volume of distributed data. The expected volume of distributed data is adjusted based on different data volume change statuses, so that the distributed service data can be adapted to a change in a sending rate of the SeNB, a change in a data transmission delay between the MeNB and the SeNB, and a change in a volume of service data received by the MeNB, thereby increasing a system throughput rate.

With reference to the fourth possible implementation of the first aspect, in a fifth possible implementation of the first aspect, before the adding a first preset adjustment value to the first expected volume of distributed data, the method further includes:

if the data volume change status is the buffered-data volume reduced state, determining whether the first expected volume of distributed data is less than a maximum volume of distributed data; and if the first expected volume of distributed data is less than the maximum volume of distributed data, performing the step of adding a first preset adjustment value to the expected volume of distributed data; or if the first expected volume of distributed data is not less than the maximum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

With reference to the fourth possible implementation of the first aspect, in a sixth possible implementation of the first aspect, before the subtracting a second preset adjustment value from the first expected volume of distributed data, the method further includes:

if the data volume change status is the buffered-data volume accumulated state, determining whether the first expected volume of distributed data is greater than a minimum volume of distributed data; and if the first expected volume of distributed data is greater than the minimum volume of distributed data, performing the step of subtracting a second preset adjustment value from the first expected volume of distributed data; or if the first expected volume of distributed data is not greater than the minimum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

With reference to the fourth possible implementation of the first aspect, in a seventh possible implementation of the first aspect, before the subtracting a third preset adjustment value from the first expected volume of distributed data, the method further includes:

if the data volume change status is the received-data volume insufficient state, determining whether the first expected volume of distributed data is greater than a minimum volume of distributed data; and if the first expected volume of distributed data is greater than the minimum volume of distributed data, performing the step of subtracting a third preset adjustment value from the first expected volume of distributed data; or if the first expected volume of distributed data is not greater than the minimum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

According to a second aspect, a service data splitting apparatus is provided, where the apparatus includes a plurality of function modules configured to perform the method according to the first aspect. In a possible implementation, the apparatus further includes another function module configured to perform the method according to the plurality of possible implementations of the first aspect. A data volume change status of distributed service data is periodically determined, and an expected volume of distributed data is adjusted based on different data volume change statuses, so that the distributed service data can be adapted to a change in a sending rate of an SeNB, a change in a data transmission delay between an MeNB and the SeNB, and a change in a volume of service data received by the MeNB, thereby increasing a system throughput rate.

According to a third aspect, a base station is provided, including a receiver, a transmitter, a memory, and a processor.

The receiver, the transmitter, and the memory are separately connected to the processor. The memory is configured to store an executable instruction of the processor. The processor is configured to:

receive distributed service data sent by a master eNodeB MeNB, and buffer the distributed service data, where the distributed service data is service data distributed by the MeNB based on a first expected volume of distributed data; determine a data volume change status of the distributed service data when a preset period expires, where the data volume change status includes a buffered-data volume reduced state, a buffered-data volume accumulated state, and a received-data volume insufficient state; adjust the first expected volume of distributed data based on the data volume change status to obtain a second expected volume of distributed data; and send the second expected volume of distributed data to the MeNB, so that the MeNB performs splitting based on the second expected volume of distributed data. The expected volume of distributed data is adjusted in a specific range based on different data volume change statuses, so that the distributed service data can be adapted to a change in a sending rate of an SeNB, a change in a data transmission delay between the MeNB and the SeNB, and a change in a volume of service data received by the MeNB when meeting a system data transmission capability, thereby increasing a system throughput rate.

Beneficial effects of the technical solutions provided in the embodiments of the present invention are as follows:

The data volume change status of the distributed service data is periodically determined, and the expected volume of distributed data is adjusted based on different data volume change statuses, so that the distributed service data can be adapted to a change in the sending rate of the SeNB and a change in the data transmission delay between the MeNB and the SeNB, thereby increasing the system throughput rate.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Figure 2A:
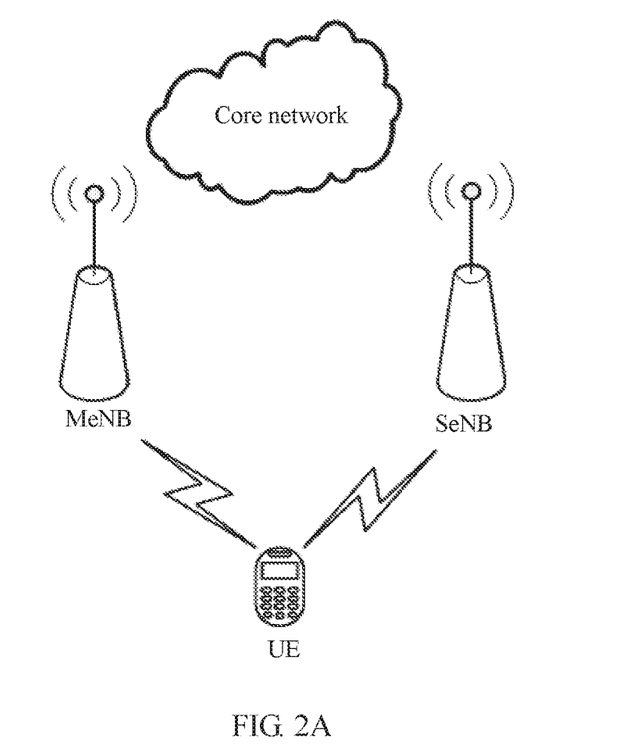
FIG. 2A is an architectural diagram of a system for splitting service data according to an embodiment of the present invention.

FIG. 2A is an architectural diagram of a system for splitting service data according to an embodiment of the present invention. Referring to FIG. 2A, the system includes a core network, an MeNB, an SeNB, and UE.

The MeNB is configured to: receive service data from the core network, and directly send the service data to the UE if the service data is service data that cannot be split, for example, service data in an RLC UM mode. The service data is split into two parts if the service data is service data that can be split, for example, service data in an RLC AM mode. One part of service data is sent by the MeNB to the UE; and the other part of service data is distributed by the MeNB to the SeNB, and is sent by the SeNB to the UE.

A process in which the MeNB distributes the service data to the SeNB may be as follows: The SeNB periodically sends an expected volume of distributed data to the MeNB. The MeNB distributes, to the SeNB based on the received expected volume of distributed data, the service data received from the core network. The expected volume of distributed data may be periodically sent by the SeNB to the MeNB based on a preset sending period. The preset sending period may be preset or modified by the system. This is not specifically limited in this embodiment of the present invention. An initial value of the expected volume of distributed data may be preset based on a data transmission capability of the SeNB. This is not specifically limited in this embodiment of the present invention. The expected volume of distributed data may be continuously adjusted by the SeNB based on a data volume change status of the SeNB, so that the distributed service data can be adapted to a change in a sending rate of the SeNB, a change in a data transmission delay between the MeNB and the SeNB, and a change in a volume of service data received by the MeNB, thereby increasing a system throughput rate. For a specific process, refer to an embodiment shown in FIG. 3A.

Figure 2B:
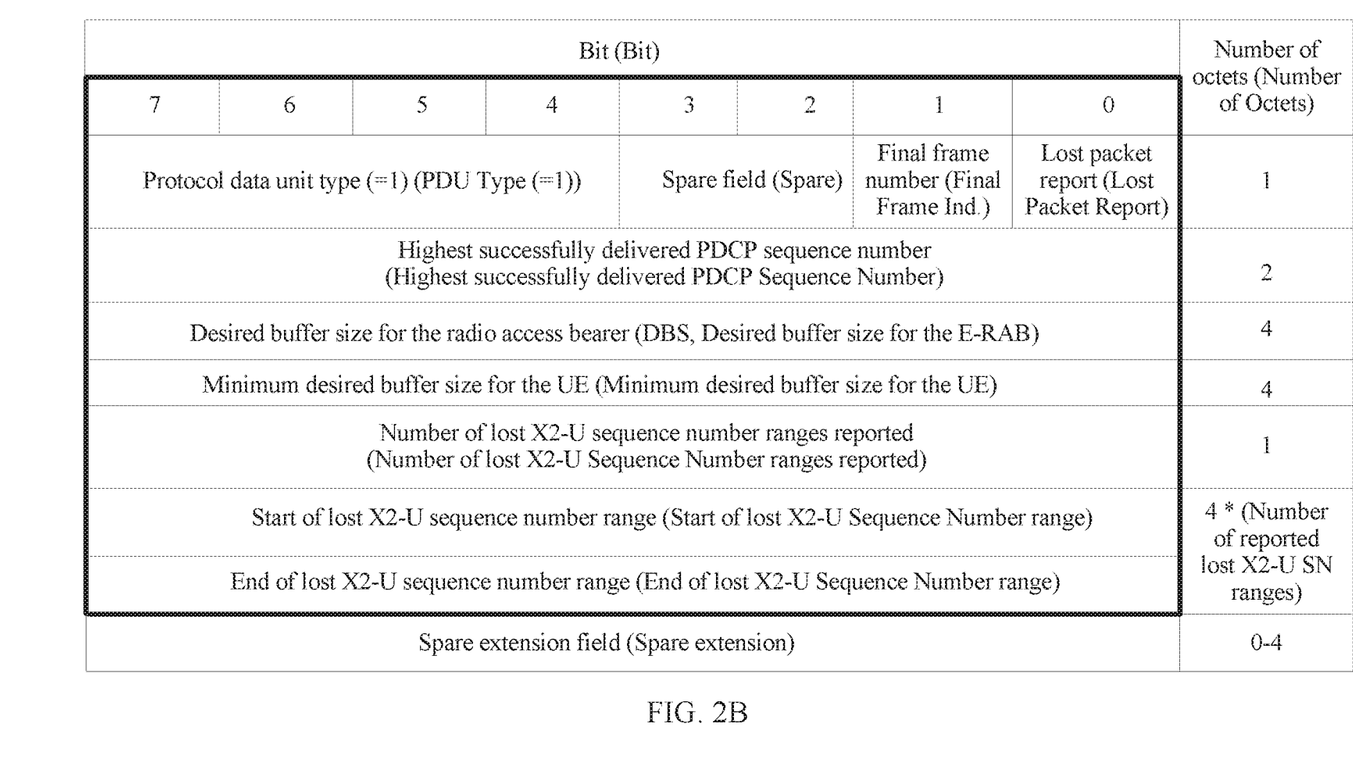
FIG. 2B is a diagram of a message format of a specified message that carries an expected volume of distributed data according to an embodiment of the present invention.

Specifically, the expected volume of distributed data may be carried in a specified message and sent to the MeNB. For example, the expected volume of distributed data is a field in the specified message. The specified message may be a DL data delivery status message or another message. A message format of the specified message may be shown in FIG. 2B. The expected volume of distributed data may be a desired buffer size field in the specified message. As shown in FIG. 2B, a length of the desired buffer size field may be 4 octets. The format of the specified message further includes a highest successfully delivered PDCP sequence number field used to indicate a maximum sequence number of a PDCP data packet successfully sent by the SeNB to the UE. A minimum desired buffer size for the UE field is used to indicate a minimum buffer size for establishing a data bearer for the UE in dual connectivity. A number of lost X2-U sequence number ranges reported field is used to indicate a reported sequence number range of lost data packets. A start of lost X2-U sequence number range field is used to indicate a start sequence number of a lost data packet. An end of lost X2-U sequence number range field is used to indicate an end sequence number of a lost data packet. A spare extension field is a spare extension field.

Figure 2C:
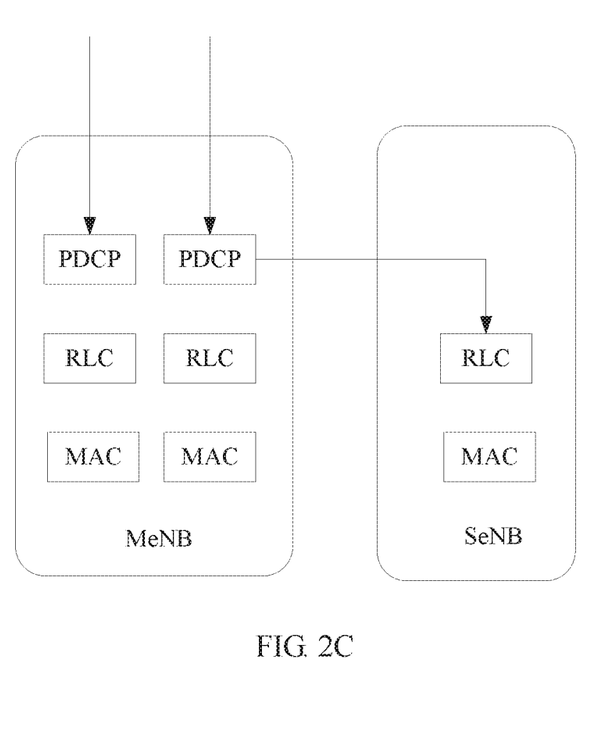
FIG. 2C is a user-plane protocol stack of an MeNB and an SeNB according to an embodiment of the present invention.

Specifically, the MeNB splits the received service data at a PDCP layer. FIG. 2C is a user-plane protocol stack of the MeNB and the SeNB. Referring to FIG. 2C, the MeNB includes a packet data convergence protocol (PDCP) layer, an RLC layer, and a media access control (MAC) layer. The SeNB includes an RLC layer and a MAC layer. After receiving the service data, the MeNB packs the service data into a PDCP protocol data unit (PDU) data packet by using the PDCP layer, and then splits the PDCP PDU data packet based on the expected volume of distributed data. A PDCP PDU data packet distributed to the SeNB is processed by the RLC layer and the MAC layer in the SeNB, and then is sent to the UE. Similarly, a PDCP PDU data packet remaining in the MeNB is processed by the RLC layer and the MAC layer in the MeNB, and then is sent to the UE.

Figure 3A:
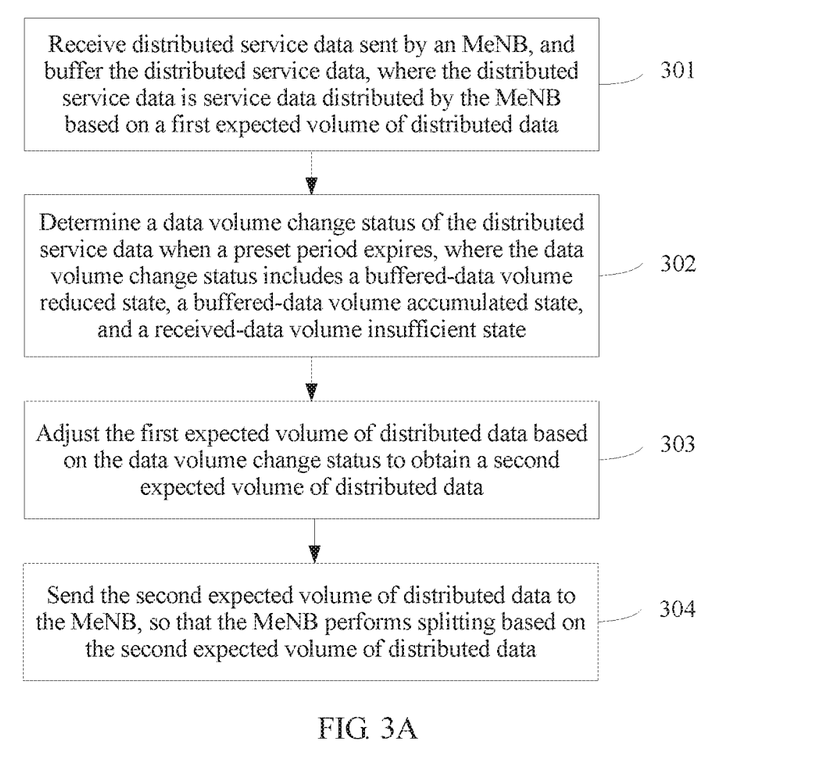
FIG. 3A is a flowchart of a service data splitting method according to an embodiment of the present invention.

FIG. 3A is a flowchart of a service data splitting method according to an embodiment of the present invention. The method is applied to an SeNB. Referring to FIG. 3A, a procedure for the method provided in this embodiment of the present invention includes the following steps:

301. Receive distributed service data sent by an MeNB, and buffer the distributed service data, where the distributed service data is service data distributed by the MeNB based on a first expected volume of distributed data.

In this embodiment of the present invention, before receiving the distributed service data, the SeNB sends the first expected volume of distributed data to the MeNB. The first expected volume of distributed data is used to indicate a data volume of service data sent by the MeNB to the SeNB each time. After receiving the first expected volume of distributed data, the MeNB distributes the service data to the SeNB based on the first expected volume of distributed data.

After buffering the distributed service data, the SeNB sends the buffered distributed service data to UE at a specific sending rate based on system scheduling.

The sending rate is not necessarily fixed, and varies with impact of a factor such as a network environment.

302. Determine a data volume change status of the distributed service data when a preset period expires, where the data volume change status includes a buffered-data volume reduced state, a buffered-data volume accumulated state, and a received-data volume insufficient state.

In this embodiment of the present invention, to avoid a decrease in a system throughput rate due to buffered-data accumulation or buffered-data insufficiency of the SeNB, the SeNB monitors a buffered-data volume of the distributed service data, to determine whether the data volume change status is the buffered-data volume reduced state or the buffered-data volume accumulated state.

Figure 3B:
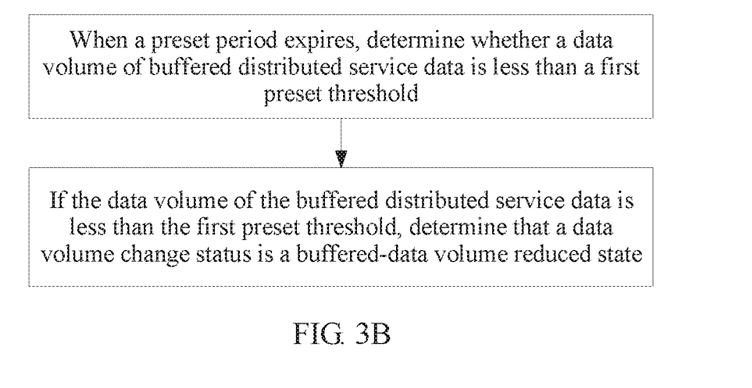
FIG. 3B is a flowchart of determining whether a data volume change status is a buffered-data volume reduced state according to an embodiment of the present invention.

A procedure for determining whether the data volume change status is the buffered-data volume reduced state may be shown in FIG. 3B, and include the following steps:

Step 1: When the preset period expires, determine whether a data volume of the buffered distributed service data is less than a first preset threshold.

Step 2: If the data volume of the buffered distributed service data is less than the first preset threshold, determine that the data volume change status is the buffered-data volume reduced state.

Step 3: If the data volume of the buffered distributed service data is not less than the first preset threshold, determine that the data volume change status is not the buffered-data volume reduced state.

The first preset threshold may be preset based on a data transmission capability of the SeNB, or may be preconfigured or modified based on a service requirement. This is not specifically limited in this embodiment of the present invention.

It should be noted that a cause of a reduction in a volume of data buffered by the SeNB may be as follows:

1. Because a volume of service data received by the MeNB is unchanged, a data transmission delay between the MeNB and the SeNB is unchanged, but a sending rate at which the SeNB sends service data to the UE increases. Consequently, in a time period, a volume of data received by the SeNB from the MeNB is unchanged, but a volume of data sent to the UE is increased, thereby causing the reduction in the volume of buffered data.

2. Because a volume of service data received by the MeNB is unchanged, a sending rate of the SeNB is unchanged, but a data transmission delay between the MeNB and the SeNB becomes large. Consequently, in a time period, a volume of data sent by the SeNB to the UE is unchanged, but a volume of data received from the MeNB is reduced, thereby causing the reduction in the volume of buffered data.

Figure 3C:
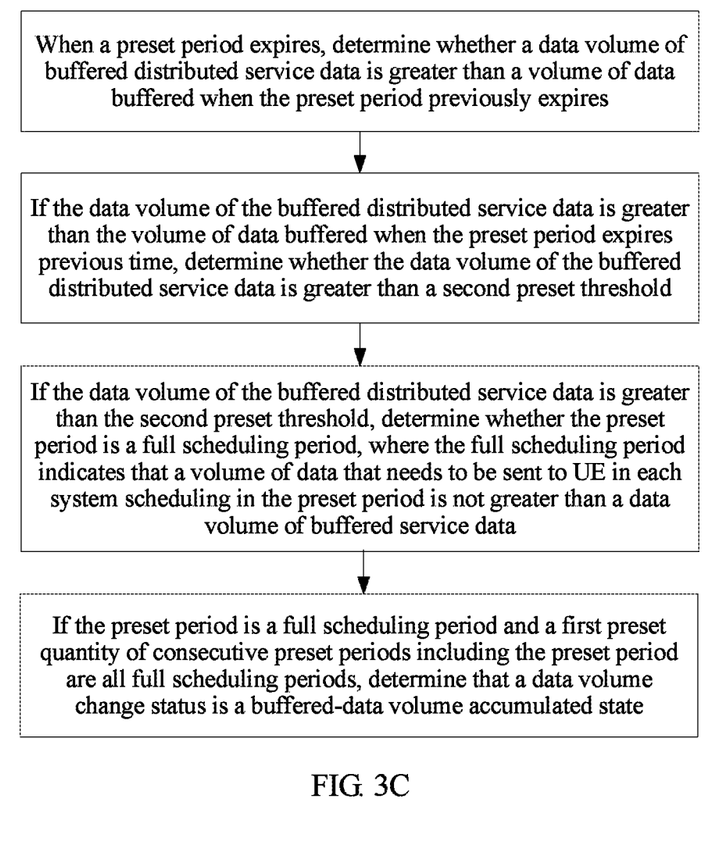
FIG. 3C is a flowchart of determining whether a data volume change status is a buffered-data volume accumulated state according to an embodiment of the present invention.

A procedure for determining whether the data volume change status is the buffered-data volume accumulated state may be shown in FIG. 3C, and include the following steps.

Step 1: When the preset period expires, determine whether a data volume of the buffered distributed service data is greater than a volume of data buffered when the preset period previously expires.

It should be noted that the SeNB records a data volume of buffered distributed service data each time the preset period expires. Specifically, a correspondence between each preset period and the data volume of the buffered distributed service data may be established.

Step 2: If the data volume of the buffered distributed service data is greater than the volume of data buffered when the preset period previously expires, determine whether the data volume of the buffered distributed service data is greater than a second preset threshold.

The second preset threshold may be preset based on a data transmission capability of the SeNB, or may be preconfigured or modified based on a service requirement. This is not specifically limited in this embodiment of the present invention. The second preset threshold is greater than the first preset threshold.

It should be noted that, if the data volume of the buffered distributed service data is not greater than the volume of data buffered when the preset period previously expires, it is determined that the data volume change status is not the buffered-data volume accumulated state.

Step 3: If the data volume of the buffered distributed service data is greater than the second preset threshold, determine whether the preset period is a full scheduling period, where the full scheduling period indicates that a data volume of service data buffered in the preset period is not less than a maximum data volume indicated in each downlink scheduling.

It should be noted that the SeNB sends service data to the UE in a timeslot indicated in downlink scheduling. For example, the SeNB needs to send the service data to the UE in a transmission time interval (TTI). Before sending the service data to the UE, a MAC layer of the SeNB calculates, based on a condition such as a location of the UE, data link quality, and air interface quality of the UE, a maximum volume of data that can be sent to the UE, namely, a maximum data volume indicated by the downlink scheduling. If the volume of buffered data is not less than the maximum data volume, service data in the maximum data volume is obtained from the buffered service data, and service data in the maximum data volume is sent to the UE. If the volume of buffered data is less than the maximum data volume, all the buffered data is sent to the UE. A maximum data volume indicated in each downlink scheduling may be the same or may be different, and is determined based on a calculation manner at the MAC layer and actual calculation data. This is not specifically limited in this embodiment of the present invention.

In this embodiment of the present invention, a quantity of times the SeNB sends service data to the UE in the preset period is not necessarily fixed, in other words, a quantity of times downlink scheduling is performed in the preset period is not necessarily fixed. The SeNB may send the service data to the UE a plurality of times in the preset period. Each time the SeNB sends the service data to the UE, the SeNB determines whether the data volume of the buffered service data is not less than the maximum data volume indicated in the downlink scheduling, and records a result of the determining. If when the preset period expires, each recoded result is that the data volume of the buffered service data is not less than the maximum data volume indicated in the downlink scheduling, it is determined that the preset period is a full scheduling period.

It should be noted that, if the data volume of the buffered distributed service data is not greater than the second preset threshold, it is determined that the data volume change status is not the buffered-data volume accumulated state.

Step 4: If the preset period is a full scheduling period and a first preset quantity of consecutive preset periods including the preset period are all full scheduling periods, determine that the data volume change status is the buffered-data volume accumulated state.

The first preset quantity may be preset or may be modified based on an actual service requirement. This is not specifically limited in this embodiment of the present invention.

The SeNB may record information about whether each preset period is a full scheduling period. If the preset period is a full scheduling period, whether the first preset quantity of consecutive preset periods including the preset period are all full scheduling periods is determined. If yes, it is determined that the data volume change status is the buffered-data volume accumulated state in this case. For example, the first preset quantity is 3, and the preset period is a full scheduling period. In this case, when both two consecutive preset periods before the preset period are full scheduling periods, it is determined that the data volume change status is the buffered-data volume accumulated state.

It should be noted that a cause of accumulation of a volume of data buffered by the SeNB may be as follows:

1. Because a volume of service data received by the MeNB is unchanged, a data transmission delay between the MeNB and the SeNB is unchanged, but a sending rate at which the SeNB sends service data to the UE decreases. Consequently, in a time period, a volume of data received by the SeNB from the MeNB is unchanged, but a volume of data sent to the UE is reduced, thereby causing the accumulation of the volume of buffered data.

2. Because a volume of service data received by the MeNB is unchanged, a sending rate of the SeNB is unchanged, but a data transmission delay between the MeNB and the SeNB becomes small. Consequently, in a time period, a volume of data sent by the SeNB to the UE is unchanged, but a volume of data received from the MeNB is increased, thereby causing the accumulation of the volume of buffered data.

It should be noted that, if the preset period is not a full scheduling period, it is determined that the data volume change status is not the buffered-data volume accumulated state; or if the preset period is a full scheduling period, but the first preset quantity of consecutive preset periods that include the preset period and that are full scheduling periods do not exist, it is determined that the data volume change status is not the buffered-data volume accumulated state.

In addition, a volume of service data received by the MeNB from a core network each time is not necessarily fixed. Therefore, when the volume of service data received by the MeNB is reduced, a data volume of service data distributed by the MeNB to the SeNB may not meet the first expected volume of distributed data. As a result, a volume of service data received by the SeNB is less than the first expected volume of distributed data, affecting a system throughput rate.

To avoid a decrease in the system throughput rate due to insufficiency of the volume of received service data, the SeNB further monitors a data volume of distributed service data received each time, to determine whether the data volume change status is the received-data volume insufficient state. A process of the determining may be shown in FIG. 3D, and include the following steps.

Figure 3D:
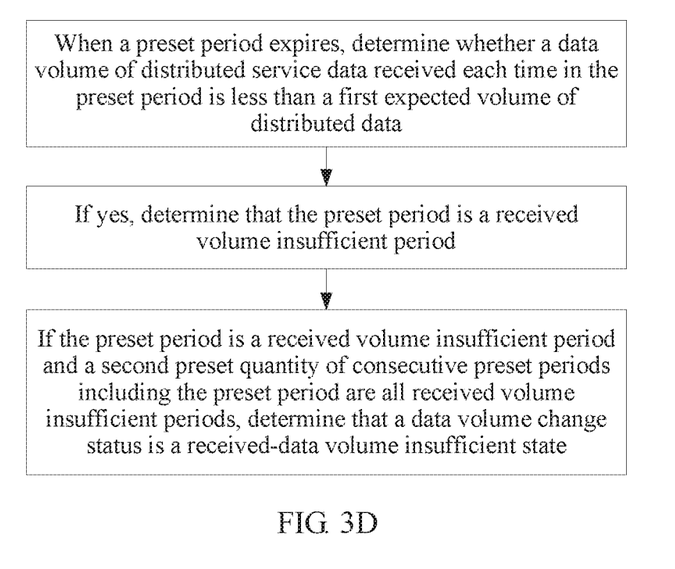
FIG. 3D is a flowchart of determining whether a data volume change status is a received-data volume insufficient state according to an embodiment of the present invention.

Step 1: When the preset period expires, determine whether a data volume of distributed service data received each time in the preset period is less than the first expected volume of distributed data.

It should be noted that a preset sending period in which the SeNB sends the expected volume of distributed data to the MeNB may be the same as or different from the preset period. For example, the preset sending period may be less than the preset period. This is not specifically limited in this embodiment of the present invention. If the preset period is the same as the preset sending period, the SeNB receives the distributed service data once in the preset period. If the preset period is different from the preset sending period, the SeNB may receive a distributed data service a plurality of times in the preset period. In the preset period, after receiving the distributed service data, the SeNB determines whether the received distributed service data is less than the first expected volume of distributed data, and records a result of the determining.

It should be noted that when receiving the distributed service data once in the preset period, the SeNB needs to determine only whether the distributed service data received in the preset period is less than the first expected volume of distributed data.

Step 2: If yes, determine that the preset period is a received volume insufficient period.

If the data volume of the distributed service data received each time in the preset period is less than the first expected volume of distributed data, it is determined that the preset period is a received volume insufficient period. If the data volume of the distributed service data received each time in the preset period is equal to the first expected volume of distributed data, it is determined that a volume of distributed service data received in the preset period is sufficient.

In another embodiment, to improve flexibility of adjusting the expected volume of distributed service data and further improve flexibility of service data splitting, when the SeNB may receive a distributed data service a plurality of times in the preset period, when a ratio of a quantity of times the volume of the received service data is less than the first expected volume of distributed data to a total quantity of receiving times exceeds a preset percentage, the SeNB may further determine that the preset period is a received volume insufficient period. For example, the preset percentage is 60%, the distributed service data is received four times in the preset period, and the volume of the received service data is less than the first expected distributed data three times. In this case, if the ratio of the quantity of times the volume of the received service data is less than the first expected volume of distributed data to the total quantity of receiving times is 75% greater than 60%, it is determined that the preset period is a received volume insufficient period. The preset percentage may be preset or modified. This is not specifically limited in this embodiment of the present invention.

Step 3: If the preset period is a received volume insufficient period and a second preset quantity of consecutive preset periods including the preset period are all received volume insufficient periods, determine that the data volume change status is the received-data volume insufficient state.

The second preset quantity may be preset or may be modified based on an actual service requirement. This is not specifically limited in this embodiment of the present invention.

The SeNB may record information about whether each preset period is a received volume insufficient period. If the preset period is a received volume insufficient period, whether the second preset quantity of consecutive preset periods including the preset period are all received volume insufficient periods. If yes, it is determined that the data volume change status is the received-data volume insufficient state in this case. For example, the second preset quantity is 3, and the preset period is a received volume insufficient period. In this case, when both two consecutive preset periods before the preset period are received volume insufficient periods, it is determined that the data volume change status is the received-data volume insufficient state.

It should be noted that, if the preset period is not a received volume insufficient period, it is determined that the data volume change status is not the received-data volume insufficient state; or if the preset period is a received volume insufficient period, but the second preset quantity of consecutive preset periods that include the preset period and that are received volume insufficient periods do not exist, it is determined that the data volume change status is not the received-data volume insufficient state.

303. Adjust the first expected volume of distributed data based on the data volume change status to obtain a second expected volume of distributed data.

Figure 3E:
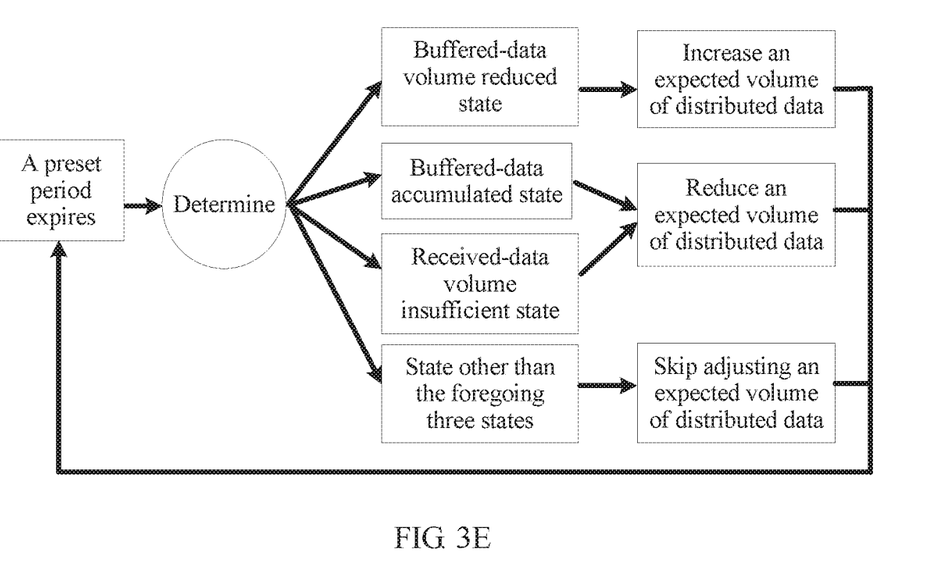
FIG. 3E is a block diagram in which an SeNB adjusts an expected volume of distributed data according to an embodiment of the present invention.

To more clearly describe a process in which the SeNB adjusts the expected volume of distributed data, this embodiment of the present invention provides a block diagram in which the SeNB adjusts the expected volume of distributed data. As shown in FIG. 3E, a process in which the SeNB adjusts the first expected volume of distributed data based on the data volume change status may have the following several cases:

1. If the data volume change status is the buffered-data volume reduced state, add a first preset adjustment value to the first expected volume of distributed data to obtain the second expected volume of distributed data.

2. If the data volume change status is the buffered-data volume accumulated state, subtract a second preset adjustment value from the first expected volume of distributed data to obtain the second expected volume of distributed data. When the SeNB is in the buffered-data volume accumulated state, the first expected volume of distributed data is subtracted, so that a volume of data subsequently received by the SeNB from the MeNB is reduced, reducing a transmission delay of the SeNB.

3. If the data volume change status is the received-data volume insufficient state, subtract a third preset adjustment value from the first expected volume of distributed data to obtain the second expected volume of distributed data.

4. If the data volume change status is not any one of the foregoing three states, the first expected volume of distributed data is not adjusted.

The first preset adjustment value, the second preset adjustment value, and the third preset adjustment value may be equal or may be not equal. This is not specifically limited in this embodiment of the present invention. All of the first preset adjustment value, the second preset adjustment value, and the third preset adjustment value may be preset and modified by the system. This is not specifically limited in this embodiment of the present invention.

It should be noted that the SeNB may adjust the expected volume of distributed data based on a maximum volume of distributed data and a minimum volume of distributed data, to avoid improper service data splitting caused by excessively large or small adjusted second expected volume of distributed data. The maximum volume of distributed data and the minimum volume of distributed data may be preset or modified by the system based on a service requirement or a data transmission capability. This is not specifically limited in this embodiment of the present invention.

Specifically, after the data volume change status is determined, the SeNB adjusts the first expected volume of distributed data based on the maximum volume of distributed data and the minimum volume of distributed data. The following several cases are included:

Case 1: If the data volume change status is the buffered-data volume reduced state, whether the first expected volume of distributed data is less than the maximum volume of distributed data is determined. If the first expected volume of distributed data is less than the maximum volume of distributed data, the step of adding a first preset adjustment value to the first expected volume of distributed data is performed. If the first expected volume of distributed data is not less than the maximum volume of distributed data, the first expected volume of distributed data is not adjusted.

Case 2: If the data volume change status is the buffered-data volume accumulated state, it is determined whether the first expected volume of distributed data is greater than the minimum volume of distributed data. If the first expected volume of distributed data is greater than the minimum volume of distributed data, the step of subtracting a second preset adjustment value from the first expected volume of distributed data is performed. If the first expected volume of distributed data is not greater than the minimum volume of distributed data, the first expected volume of distributed data is not adjusted.

Case 3: If the data volume change status is the received-data volume insufficient state, it is determined whether the first expected volume of distributed data is greater than the minimum volume of distributed data. If the first expected volume of distributed data is greater than the minimum volume of distributed data, the step of subtracting a third preset adjustment value from the first expected volume of distributed data is performed. If the first expected volume of distributed data is not greater than the minimum volume of distributed data, the first expected volume of distributed data is not adjusted.

304. Send the second expected volume of distributed data to the MeNB, so that the MeNB performs splitting based on the second expected volume of distributed data.

In an implementation of the present disclosure, when the preset period expires, the SeNB may send the obtained second expected volume of distributed data to the MeNB, in other words, the SeNB may send the expected volume of distributed data to the MeNB based on the preset period. In addition, alternatively, a period in which the SeNB sends the expected volume of distributed data to the MeNB may be different from the preset period. This is not specifically limited in this embodiment of the present invention.

After receiving the second expected volume of distributed data, the MeNB performs splitting based on the second volume of distributed data, and sends the distributed service data to the SeNB.

It should be noted that the method provided in this embodiment of the present invention may be applied to a splitting scenario in an LTE system, or may be applied to a splitting scenario in another communications standard, for example, an LTE and Wireless Fidelity (WiFi) splitting scenario. This is not specifically limited in this embodiment of the present invention.

According to the method provided in this embodiment of the present invention, the data volume change status of the distributed service data is periodically determined, and the expected volume of distributed data is adjusted based on different data volume change statuses, so that the distributed service data can be adapted to a change in the sending rate of the SeNB, a change in the data transmission delay between the MeNB and the SeNB, and a change in the volume of service data received by the MeNB, thereby increasing the system throughput rate. Further, when the SeNB is in the buffered-data volume accumulated state, the first expected volume of distributed data is subtracted, so that a volume of data subsequently received by the SeNB from the MeNB is reduced, reducing a transmission delay of the SeNB.

Figure 4:
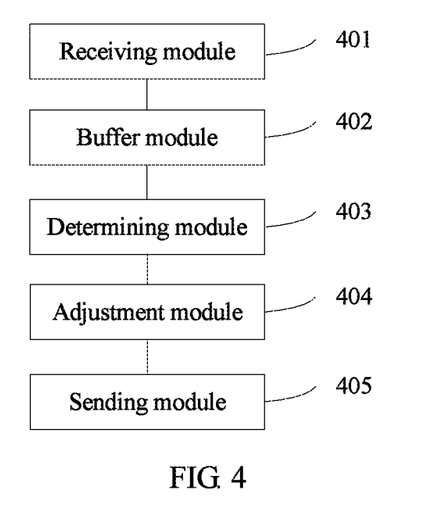
FIG. 4 is a block diagram of a service data splitting apparatus according to an embodiment of the present invention.

FIG. 4 is a block diagram of a service data splitting apparatus according to the present disclosure. The apparatus is applied to an SeNB. Referring to FIG. 4, the apparatus includes a receiving module 401, a buffer module 402, a determining module 403, an adjustment module 404, and a sending module 405.

The receiving module 401 is connected to the buffer module 402, and is configured to receive distributed service data sent by an MeNB. The distributed service data is service data distributed by the MeNB based on a first expected volume of distributed data. The buffer module 402 is connected to the determining module 403, and is configured to buffer the distributed service data. The determining module 403 is connected to the adjustment module 404, and is configured to determine a data volume change status of the distributed service data when a preset period expires. The data volume change status includes a buffered-data volume reduced state, a buffered-data volume accumulated state, and a received-data volume insufficient state. The adjustment module 404 is connected to the sending module 405, and is configured to adjust the first expected volume of distributed data based on the data volume change status to obtain a second expected volume of distributed data. The sending module 405 is configured to send the second expected volume of distributed data to the MeNB, so that the MeNB performs splitting based on the second expected volume of distributed data.

Optionally, the determining module 403 is configured to: when the preset period expires, if a data volume of the buffered distributed service data is less than a first preset threshold, determine that the data volume change status is the buffered-data volume reduced state.

Optionally, the determining module 403 is configured to: when the preset period expires, determine whether a data volume of the buffered distributed service data is greater than a volume of data buffered when the preset period previously expires; if the data volume of the buffered distributed service data is greater than the volume of data buffered when the preset period previously expires, determine whether the data volume of the buffered distributed service data is greater than a second preset threshold; if the data volume of the buffered distributed service data is greater than the second preset threshold, determine whether the preset period is a full scheduling period, where the full scheduling period indicates that a data volume of service data buffered in the preset period is not less than a maximum data volume indicated in each downlink scheduling; and if the preset period is a full scheduling period and a first preset quantity of consecutive preset periods including the preset period are all full scheduling periods, determine that the data volume change status is the buffered-data volume accumulated state.

Optionally, the determining module 403 is configured to: when the preset period expires, determine whether a data volume of distributed service data received each time in the preset period is less than the first expected volume of distributed data; if yes, determine that the preset period is a received volume insufficient period; and if the preset period is a received volume insufficient period and a second preset quantity of consecutive preset periods including the preset period are all received volume insufficient periods, determine that the data volume change status is the received-data volume insufficient state.

Optionally, the adjustment module 404 is configured to: if the data volume change status is the buffered-data volume reduced state, add a first preset adjustment value to the first expected volume of distributed data to obtain the second expected volume of distributed data; or if the data volume change status is the buffered-data volume accumulated state, or if the data volume change status is the received-data volume insufficient state, subtract a second preset adjustment value from the first expected volume of distributed data to obtain the second expected volume of distributed data.

Optionally, the adjustment module 404 is further configured to: if the data volume change status is the buffered-data volume reduced state, determine whether the first expected volume of distributed data is less than a maximum volume of distributed data; and if the first expected volume of distributed data is less than the maximum volume of distributed data, perform the step of adding a first preset adjustment value to the first expected volume of distributed data; or if the first expected volume of distributed data is not less than the maximum volume of distributed data, skip adjusting the first expected volume of distributed data.

Optionally, the adjustment module 404 is further configured to: if the data volume change status is the buffered-data volume accumulated state, or the data volume change status is the received-data volume insufficient state, determine whether the first expected volume of distributed data is greater than a minimum volume of distributed data; and if the first expected volume of distributed data is greater than the minimum volume of distributed data, perform the step of subtracting a second preset adjustment value from the first expected volume of distributed data; or if the first expected volume of distributed data is not greater than the minimum volume of distributed data, skip adjusting the first expected volume of distributed data.

According to the apparatus provided in this embodiment of the present invention, the data volume change status of the distributed service data is periodically determined, and the expected volume of distributed data is adjusted based on different data volume change statuses, so that the distributed service data can be adapted to a change in a sending rate of the SeNB and a change in a data transmission delay between the MeNB and the SeNB, thereby increasing a system throughput rate.

It should be noted that when the data transmission apparatus provided in the foregoing embodiment performs service data splitting, division of the foregoing function modules is merely used as an example for description. In actual application, the foregoing functions may be allocated to different function modules and implemented based on a requirement, in other words, an internal structure of the apparatus is divided into different function modules for implementing all or some of the functions described above. In addition, the service data splitting apparatus provided in the foregoing embodiment belongs to a same concept as the embodiments of the service data splitting method. For a specific implementation process, refer to the method embodiments. Details are not described herein again.

Figure 5:
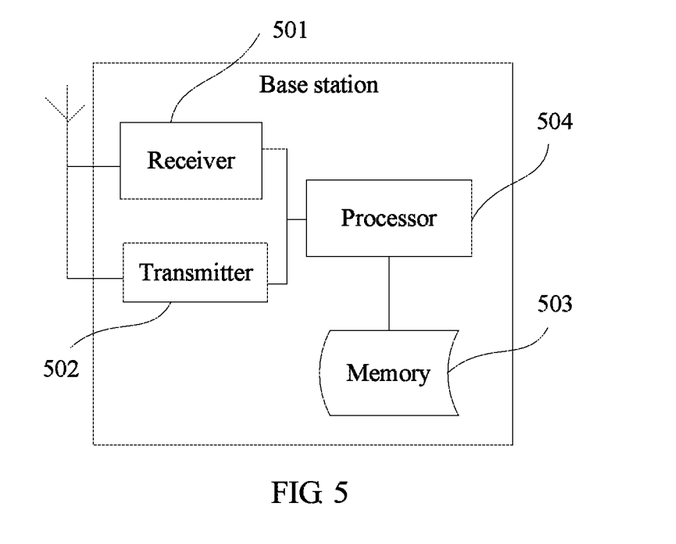
FIG. 5 is a schematic structural diagram of a base station according to an embodiment of the present invention.

FIG. 5 is a schematic structural diagram of a base station according to an embodiment of the present invention. Referring to FIG. 5, the base station includes a receiver 501, a transmitter 502, a memory 503, and a processor 504. The receiver 501, the transmitter 502, and the memory 503 are separately connected to the processor 504. The memory 503 is configured to store an executable instruction of the processor.

The processor 504 is configured to:

receive distributed service data sent by a master eNodeB MeNB, and buffer the distributed service data, where the distributed service data is service data distributed by the MeNB based on a first expected volume of distributed data; determine a data volume change status of the distributed service data when a preset period expires, where the data volume change status includes a buffered-data volume reduced state, a buffered-data volume accumulated state, and a received-data volume insufficient state; adjust the first expected volume of distributed data based on the data volume change status to obtain a second expected volume of distributed data; and send the second expected volume of distributed data to the MeNB, so that the MeNB performs splitting based on the second expected volume of distributed data.

Optionally, the determining a data volume change status of the distributed service data when a preset period expires includes:

when the preset period expires, if a data volume of the buffered distributed service data is less than a first preset threshold, determining that the data volume change status is the buffered-data volume reduced state. It is determined that the data volume change status is the data volume reduced state. Therefore, the SeNB can increase the first expected volume of distributed data based on the state, so as to increase a volume of data subsequently received by the SeNB from the MeNB, and further increase a system throughput rate.

Optionally, the determining a data volume change status of the distributed service data when a preset period expires includes:

when the preset period expires, determining whether a data volume of the buffered distributed service data is greater than a volume of data buffered when the preset period previously expires;

if the data volume of the buffered distributed service data is greater than the volume of data buffered when the preset period previously expires, determining whether the data volume of the buffered distributed service data is greater than a second preset threshold;

if the data volume of the buffered distributed service data is greater than the second preset threshold, determining whether the preset period is a full scheduling period, where the full scheduling period indicates that a volume of data that needs to be sent to UE in each system scheduling in the preset period is not greater than a data volume of buffered service data; and if the preset period is a full scheduling period and a first preset quantity of consecutive preset periods including the preset period are all full scheduling periods, determining that the data volume change status is the buffered-data volume accumulated state. It is determined that the data volume change status is the data volume accumulated state. Therefore, the SeNB can reduce the first expected volume of distributed data based on the state, so as to reduce a volume of data subsequently received by the SeNB from the MeNB, and further reduce a transmission delay of the SeNB.

Optionally, the determining a data volume change status of the distributed service data when a preset period expires includes:

when the preset period expires, determining whether a data volume of distributed service data received each time in the preset period is less than the first expected volume of distributed data;

if yes, determining that the preset period is a received volume insufficient period; and if the preset period is a received volume insufficient period and a second preset quantity of consecutive preset periods including the preset period are all received volume insufficient periods, determining that the data volume change status is the received-data volume insufficient state. It is determined that the data volume change status is the received-data volume insufficient state. Therefore, the SeNB can reduce the first expected volume of distributed data based on the state, so as to reduce a volume of data subsequently received by the SeNB from the MeNB, and further increase a system throughput rate.

Optionally, the adjusting the first expected volume of distributed data based on the data volume change status to obtain a second expected volume of distributed data includes:

if the data volume change status is the buffered-data volume reduced state, adding a first preset adjustment value to the first expected volume of distributed data to obtain the second expected volume of distributed data; or if the data volume change status is the buffered-data volume accumulated state, subtracting a second preset adjustment value from the first expected volume of distributed data to obtain the second expected volume of distributed data; or if the data volume change status is the received-data volume insufficient state, subtracting a third preset adjustment value from the first expected volume of distributed data to obtain the second expected volume of distributed data. The expected volume of distributed data is adjusted based on different data volume change statuses, so that the distributed service data can be adapted to a change in a sending rate of the SeNB, a change in a data transmission delay between the MeNB and the SeNB, and a change in a volume of service data received by the MeNB, thereby increasing a system throughput rate.

Optionally, before the adding a first preset adjustment value to the first expected volume of distributed data, the method further includes:

if the data volume change status is the buffered-data volume reduced state, determining whether the first expected volume of distributed data is less than a maximum volume of distributed data; and if the first expected volume of distributed data is less than the maximum volume of distributed data, performing the step of adding a first preset adjustment value to the expected volume of distributed data; or if the first expected volume of distributed data is not less than the maximum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

Optionally, before the subtracting a second preset adjustment value from the first expected volume of distributed data, the method further includes:

if the data volume change status is the buffered-data volume accumulated state, determining whether the first expected volume of distributed data is greater than a minimum volume of distributed data; and if the first expected volume of distributed data is greater than the minimum volume of distributed data, performing the step of subtracting a second preset adjustment value from the first expected volume of distributed data; or if the first expected volume of distributed data is not greater than the minimum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

Optionally, before the subtracting a third preset adjustment value from the first expected volume of distributed data, the method further includes:

if the data volume change status is the received-data volume insufficient state, determining whether the first expected volume of distributed data is greater than a minimum volume of distributed data; and if the first expected volume of distributed data is greater than the minimum volume of distributed data, performing the step of subtracting a third preset adjustment value from the first expected volume of distributed data; or if the first expected volume of distributed data is not greater than the minimum volume of distributed data, skipping adjusting the first expected volume of distributed data. The expected volume of distributed data is adjusted in a specific range based on different data volume change statuses, so that the distributed service data can be adapted to a change in a sending rate of the SeNB, a change in a data transmission delay between the MeNB and the SeNB, and a change in a volume of service data received by the MeNB when meeting a system data transmission capability, thereby increasing a system throughput rate.

According to the base station provided in this embodiment of the present invention, the data volume change status of the distributed service data is periodically determined, and the expected volume of distributed data is adjusted based on different data volume change statuses, so that the distributed service data can be adapted to a change in the sending rate of the SeNB and a change in the data transmission delay between the MeNB and the SeNB, thereby increasing the system throughput rate.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely examples of embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A service data splitting method, wherein the method comprises:

receiving, by a secondary eNB (SeNB), distributed service data from a master eNodeB (MeNB), and buffering the distributed service data by the SeNB, wherein the distributed service data is service data distributed by the MeNB based on a first expected volume of distributed data;

determining, by the SeNB, a data volume change status of the distributed service data when a preset period expires, wherein the data volume change status comprises a buffered-data volume reduced state, a buffered-data volume accumulated state, and a received-data volume insufficient state;

adjusting, by the SeNB, the first expected volume of distributed data based on the data volume change status to obtain a second expected volume of distributed data; and sending, by the SeNB, the second expected volume of distributed data to the MeNB, so that the MeNB performs splitting based on the second expected volume of distributed data, wherein the determining a data volume change status of the distributed service data when a preset period expires comprises:

when the preset period expires, determining, by the SeNB, whether a data volume of the buffered distributed service data is greater than a volume of data buffered when the preset period previously expires;

if the data volume of the buffered distributed service data is greater than the volume of data buffered when the preset period previously expires, determining, by the SeNB, whether the data volume of the buffered distributed service data is greater than a first preset threshold;

if the data volume of the buffered distributed service data is greater than the first preset threshold, determining, by the SeNB, whether the preset period is a full scheduling period, wherein the full scheduling period indicates that a data volume of service data buffered in the preset period is not less than a maximum data volume indicated in each downlink scheduling; and if the preset period is a full scheduling period and a first preset quantity of consecutive preset periods comprising the preset period are all full scheduling periods, determining, by the SeNB, that the data volume change status is the buffered-data volume accumulated state.

2. The method according to claim 1, wherein the determining a data volume change status of the distributed service data when the preset period expires further comprises:

when the preset period expires, if a data volume of the buffered distributed service data is less than a second preset threshold, determining, by the SeNB, that the data volume change status is the buffered-data volume reduced state.

3. The method according to claim 1, wherein the determining a data volume change status of the distributed service data when a preset period expires comprises:

when the preset period expires, determining, by the SeNB, whether a data volume of distributed service data received each time in the preset period is less than the first expected volume of distributed data;

if the data volume of the distributed service data received each time in the preset period is less than the first expected volume of distributed data, determining, by the SeNB, that the preset period is a received-data volume insufficient period; and if the preset period is a received-data volume insufficient period and a second preset quantity of consecutive preset periods comprising the preset period are all received-data volume insufficient periods, determining, by the SeNB, that the data volume change status is the received-data volume insufficient state.

4. The method according to claim 1, wherein the adjusting the first expected volume of distributed data based on the data volume change status to obtain a second expected volume of distributed data comprises:

if the data volume change status is the buffered-data volume reduced state, adding, by the SeNB, a first preset adjustment value to the first expected volume of distributed data to obtain the second expected volume of distributed data;

if the data volume change status is the buffered-data volume accumulated state, subtracting, by the SeNB, a second preset adjustment value from the first expected volume of distributed data to obtain the second expected volume of distributed data; and if the data volume change status is the received-data volume insufficient state, subtracting, by the SeNB, a third preset adjustment value from the first expected volume of distributed data to obtain the second expected volume of distributed data.

5. The method according to claim 4, wherein before the adding the first preset adjustment value to the first expected volume of distributed data, the method further comprises:

if the data volume change status is the buffered-data volume reduced state, determining, by the SeNB, whether the first expected volume of distributed data is less than a maximum volume of distributed data; and if the first expected volume of distributed data is less than the maximum volume of distributed data, performing, by the SeNB, the step of adding the first preset adjustment value to the first expected volume of distributed data; and if the first expected volume of distributed data is not less than the maximum volume of distributed data, skipping, by the SeNB, adjusting the first expected volume of distributed data.

6. The method according to claim 4, wherein before the subtracting the second preset adjustment value from the first expected volume of distributed data, the method further comprises:

if the data volume change status is the buffered-data volume accumulated state, determining, by the SeNB, whether the first expected volume of distributed data is greater than a minimum volume of distributed data; and if the first expected volume of distributed data is greater than the minimum volume of distributed data, performing, by the SeNB, the step of subtracting the second preset adjustment value from the first expected volume of distributed data; and if the first expected volume of distributed data is not greater than the minimum volume of distributed data, skipping, by the SeNB, adjusting the first expected volume of distributed data.

7. The method according to claim 4, wherein before the subtracting the third preset adjustment value from the first expected volume of distributed data, the method further comprises:

if the data volume change status is the received-data volume insufficient state, determining, by the SeNB, whether the first expected volume of distributed data is greater than a minimum volume of distributed data; and if the first expected volume of distributed data is greater than the minimum volume of distributed data, performing, by the SeNB, the step of subtracting the third preset adjustment value from the first expected volume of distributed data; and if the first expected volume of distributed data is not greater than the minimum volume of distributed data, skipping, by the SeNB, adjusting the first expected volume of distributed data.

8. An apparatus, comprising a receiver, a transmitter, and a processor, wherein the receiver is configured to receive distributed service data from a master eNodeB (MeNB), wherein the distributed service data is service data distributed by the MeNB based on a first expected volume of distributed data;

the processor is configured to buffer the distributed service data and determine a data volume change status of the distributed service data when a preset period expires, wherein the data volume change status comprises a buffered-data volume reduced state, a buffered-data volume accumulated state, and a received-data volume insufficient state;

the processor is further configured to adjust the first expected volume of distributed data based on the data volume change status to obtain a second expected volume of distributed data; and the transmitter is configured to send the second expected volume of distributed data to the MeNB, so that the MeNB performs splitting based on the second expected volume of distributed data, wherein the processor is configured to:

when the preset period expires, determine whether a data volume of the buffered distributed service data is greater than a volume of data buffered when the preset period previously expires;

if the data volume of the buffered distributed service data is greater than the volume of data buffered when the preset period previously expires, determine whether the data volume of the buffered distributed service data is greater than a first preset threshold;

if the data volume of the buffered distributed service data is greater than the first preset threshold, determine whether the preset period is a full scheduling period, wherein the full scheduling period indicates that a data volume of service data buffered in the preset period is not less than a maximum data volume indicated in each downlink scheduling; and if the preset period is a full scheduling period and a first preset quantity of consecutive preset periods comprising the preset period are all full scheduling periods, determine that the data volume change status is the buffered-data volume accumulated state.

9. The apparatus according to claim 8, wherein the processor is configured to: when the preset period expires, if a data volume of the buffered distributed service data is less than a second preset threshold, determine that the data volume change status is the buffered-data volume reduced state.

10. The apparatus according to claim 8, wherein the processor is configured to:

when the preset period expires, determine whether a data volume of distributed service data received each time in the preset period is less than the first expected volume of distributed data;

if the data volume of the distributed service data received each time in the preset period is less than the first expected volume of distributed data, determine that the preset period is a received-data volume insufficient period; and if the preset period is a received-data volume insufficient period and a second preset quantity of consecutive preset periods comprising the preset period are all received-data volume insufficient periods, determine that the data volume change status is the received-data volume insufficient state.

11. The apparatus according to claim 8, wherein the processor is configured to:

if the data volume change status is the buffered-data volume reduced state, add a first preset adjustment value to the first expected volume of distributed data to obtain the second expected volume of distributed data;

if the data volume change status is the buffered-data volume accumulated state, subtract a second preset adjustment value from the first expected volume of distributed data to obtain the second expected volume of distributed data; and if the data volume change status is the received-data volume insufficient state, subtract a third preset adjustment value from the first expected volume of distributed data to obtain the second expected volume of distributed data.

12. The apparatus according to claim 11, wherein the processor is further configured to:

if the data volume change status is the buffered-data volume reduced state, determine whether the first expected volume of distributed data is less than a maximum volume of distributed data; and if the first expected volume of distributed data is less than the maximum volume of distributed data, perform the step of adding the first preset adjustment value to the first expected volume of distributed data; and if the first expected volume of distributed data is not less than the maximum volume of distributed data, skip adjusting the first expected volume of distributed data.

13. The apparatus according to claim 11, wherein the processor is further configured to:

if the data volume change status is the buffered-data volume accumulated state, determine whether the first expected volume of distributed data is greater than a minimum volume of distributed data; and if the first expected volume of distributed data is greater than the minimum volume of distributed data, perform the step of subtracting the second preset adjustment value from the first expected volume of distributed data; and if the first expected volume of distributed data is not greater than the minimum volume of distributed data, skip adjusting the first expected volume of distributed data.

14. The apparatus according to claim 11, wherein the processor is further configured to:

if the data volume change status is the received-data volume insufficient state, determine whether the first expected volume of distributed data is greater than a minimum volume of distributed data; and if the first expected volume of distributed data is greater than the minimum volume of distributed data, perform the step of subtracting the third preset adjustment value from the first expected volume of distributed data; and if the first expected volume of distributed data is not greater than the minimum volume of distributed data, skip adjusting the first expected volume of distributed data.

* * * * *